(12) United States Patent
Yang et al.

(10) Patent No.: US 11,912,933 B1
(45) Date of Patent: Feb. 27, 2024

(54) SUSPENSION MODIFIER DIRECTLY ADDED INTO FRACTURING FLUID FOR REAL-TIME PROPPANT MODIFICATION DURING FRACTURING AND THE APPLICATION THEREOF

(71) Applicant: Chengdu University of Technology, Chengdu (CN)

(72) Inventors: Bo Yang, Chengdu (CN); Yu Liu, Chengdu (CN); Hao Zhang, Chengdu (CN); Di Yang, Chengdu (CN); Min Ren, Chengdu (CN); Yang Yang, Chengdu (CN); Ying Zhong, Chengdu (CN); Bin Yang, Chengdu (CN); Jiping She, Chengdu (CN)

(73) Assignee: Chengdu University of Technology, Chengdu (CN)

( * ) Notice: Subject to any disclaimer, the term of this patent is extended or adjusted under 35 U.S.C. 154(b) by 0 days.

(21) Appl. No.: 18/495,788

(22) Filed: Oct. 27, 2023

(30) Foreign Application Priority Data

Apr. 3, 2023 (CN) .......................... 202310345166.6

(51) Int. Cl.
*C09K 8/60* (2006.01)
(52) U.S. Cl.
CPC .................... *C09K 8/602* (2013.01)
(58) Field of Classification Search
CPC ....................................................... E21B 43/26
See application file for complete search history.

(56) References Cited

U.S. PATENT DOCUMENTS

| 2013/0081812 A1* | 4/2013 | Green | E21B 43/267 166/280.1 |
| 2017/0145300 A1* | 5/2017 | Lu | C09K 8/80 |

FOREIGN PATENT DOCUMENTS

| CN | 111548783 A | 8/2020 |
| CN | 112094636 A | 12/2020 |
| CN | 114032085 A | 2/2022 |

* cited by examiner

Primary Examiner — William D Hutton, Jr.
Assistant Examiner — Avi T Skaist
(74) Attorney, Agent, or Firm — Nitin Kaushik

(57) ABSTRACT

The invention provides a suspension modifier directly added into fracturing fluid for real-time proppant modification during fracturing and the application thereof, relating to the field of oil and gas production technologies. The suspension modifier is a controlled release nanoemulsion and comprises surface hydrophobic modifier, surfactant, cosurfactant and water. The suspension modifier is directly added into clear-water or active-water fracturing fluid while the proppant is added into water. After stirring, the suspension modifier is capable of self-assembling and being adsorbed on the proppant surface, so that the proppant surface becomes hydrophobic and aerophilic. The invention no longer requires the proppant to be pretreated, and the bubble-suspended proppant can be obtained directly by adding the suspension modifier to the clear-water or active-water fracturing fluid, and meanwhile adding the proppant to the fracturing fluid. This technology is not only easy to operate, but also low in cost for proppant treatment.

5 Claims, 2 Drawing Sheets

SUSPENSION MODIFIER DIRECTLY ADDED INTO FRACTURING FLUID FOR REAL-TIME PROPPANT MODIFICATION DURING FRACTURING AND THE APPLICATION THEREOF

CROSS-REFERENCE TO RELATED APPLICATIONS

The application claims priority to Chinese patent application No. 2023103451666, filed on Apr. 3, 2023, the entire contents of which are incorporated herein by reference.

TECHNICAL FIELD

The invention relates to the field of oil and gas production technologies, in particular to a suspension modifier directly added into fracturing fluid for real-time proppant modification during fracturing and the application thereof.

BACKGROUND

As the hydraulic fracturing has become a common stimulation technology for unconventional oil and gas reservoirs (shale gas, tight sandstone gas and CBM gas), whether the fracturing fluid can effectively carry proppant to distal fractures and effectively prop them is a critical factor affecting the fracturing performance.

Clear-water or active-water fracturing fluid is featured by low cost and low damage, but it is poor in drag reduction and proppant carrying; therefore, it is commonly used in shallow reservoirs that are sensitive to gel damage, such as midshallow CBM. Coal beds have characteristics such as softness, well-developed cleavages, and strong adsorption. There are different requirements for fracturing fluid according to actual construction conditions. The gel fracturing fluid is a highly proppant-carrying fluid used for fracturing the CBM wells, but the cost is high. Due to the strong adsorption of coal bed, it is easy to cause gel fluid or gel breaking fluid to block some pores and fractures in the reservoir, resulting in a decrease in desorption and seepage velocity, and a reduction in gas well production after fracturing. With little damage to formation, clear fracturing fluid and nitrogen-foam fracturing fluid is effective in proppant-carrying and displaced into long fractures, but their cost is high, which is unfavorable to the cost-effective exploitation of CBM. Therefore, active water or clear water with low damage and low cost is often used as fracturing fluid in CBM fracturing sites. However, due to the low viscosity, high filtration loss and poor proppant carrying capability of clear-water fracturing fluid, the proppant settle in clear water quickly and a large amount of proppant is deposited in the immediate vicinity of wellbore and at the fracture bottom, resulting in a large area of stimulated fractures, but the effective propping proportion is very low. Therefore, when clear-water fracturing fluid is used, the commonly used fracturing method has high displacement, large fluid volume, and low proppant ratio. This operation mode increases water consumption, and the problem of proppant settlement has not been effectively solved, which is easy to cause proppant screenout in stimulation, resulting in short propped fractures and limiting the production of CBM wells.

How to improve the transport distance of proppant in clear water is the key to realize cost-effective fracturing of CBM. The bubble-suspended proppant is one of the hot research topics in recent years. The main idea of bubble-suspended proppant technology is to modify the surface of the proppant to become aerophilic. After the proppant absorbs the gas in the environment, its bulk density is reduced, and it is suspended in the fracturing fluid, substantially improving the proppant carrying performance of the fracturing fluid. The bubble-suspended proppant method breaks through the traditional idea of carrying proppant in fracturing by the fracturing fluid viscosity and the pumping speed. The proppant suspended in fracturing fluid flows with the fracturing fluid and migrates to distal fractures and effectively prop them to reduce the risk of proppant screenout. In the Patent CN201911035692.2 "An Air Suspension Modifier for Fracturing Proppant and Construction Method Thereof", the surface of proppant particles is modified with direct spraying, but special equipment is required for modification. In Patent CN202111590099.1 "A Highly Efficient Bubble-Suspended Proppant for Fracturing and Preparation Method Thereof", the proppant particles are roughed and then modified, actualizing sufficient modification, with complicated preparation procedure. In Patent CN114933893A "A Proppant Suspension Modifier for Self-suspension Clear-water Fracturing Proppant and Preparation Method and Application Thereof", the proppant suspension modifier is prepared with alkoxy group instead of organosilicon compound as the collector, and fatty alcohol, cyclitol or spraytex as foaming agent. After the proppant particles are modified with the proppant suspension modifier, the proppant can be suspended in clear water. However, the above methods of using gas suspended proppant need to modify the proppant in advance, and the modification procedure is complicated, which is unfavorable to construction and high in cost. If the proppant can be modified during fracturing and proppant addition, it will greatly simplify the existing proppant modification procedure and significantly reduce application costs. However, existing hydrophobic modifiers are usually insoluble in water, or should be treated by multiple steps rather than directing added and mixed in water for modification. So far there is no method to actualize this concept.

SUMMARY

In view of the above problems, the patent discloses a suspension modifier directly added into fracturing fluid for real-time proppant modification during fracturing and the application thereof. The present invention no longer requires the proppant to be pretreated, and the bubble-suspended proppant can be obtained by adding the suspension modifier in a certain proportion to the fracturing fluid during fracturing. This technology is not only easy to operate, but also low in the cost for proppant treatment, greatly reducing treatment costs.

The following technical solutions are employed in the invention:

The invention provides a suspension modifier directly added into fracturing fluid for real-time proppant modification during fracturing. The suspension modifier comprises 1 to 2 parts by weight (pbw) of surface hydrophobic modifier, 0.5 to 1 pbw of surfactant, 0.5 to 2.4 pbw of cosurfactant, and 3 to 3.5 pbw of water; the surface hydrophobic modifier is a siloxane compound and its composition.

Further, the preferred structure of the surface hydrophobic modifier is as follows:

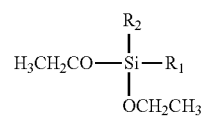

$R_1$ is one of acrylamide or oxyethyl chain containing —$NH_2$ or —$NH_2$ alkane with a unit number of 1 to 10; $R_2$ is linear chain with 8 to 20 carbon atoms, branched alkane, alkylene, or hydrocarbon groups with N, O and S elements.

Further, the surfactant is one or more combinations of alkyl polyoxyethylene ether sulfate, alkyl amidepropyl betaine, polyoxyethylene sorbitan fatty acid esters, polyethylene glycol, disodium monolauryl sulfosuccinate, sodium lauryl sulfate, potassium didodecyl phosphate, and potassium monoalkyl phosphate;

Further, the cosurfactant is one or more combinations of diisopropyl benzene peroxide, diethylenetriamine, ethylene glycol, normal propyl alcohol, isopropyl alcohol, propylene glycol, and n-butyl alcohol.

The invention also provides a preparation method of the directly added suspension modifier, which comprises:
Step 1: Mix surface hydrophobic modifier, surfactant, cosurfactant and water to obtain microemulsion stock solution;
Step 2: Mix 10 pbw of microemulsion stock solution and 20 to 40 pbw of water and stir them for 30 min to obtain suspension modifier.

The invention also provides a method for directly adding a suspension modifier into the fracturing fluid to modify the proppant in real time, wherein the following raw materials are added and mixed in the proppant blender during fracturing: 0.15 to 0.5 pbw of suspension modifier, 20 pbw of proppant, 0.01 pbw of release agent and 100 pbw of water, to complete the real-time modification of the proppant with the suspension modifier.

Further, the proppant is one or more combinations of 40 to 70 meshes quartz sand and ceramic particles; the stirring speed is 400 r/min; the stirring time is 1 min.

Further, the release agent is a grafted polyether demulsifier, with a structure of $D(PO)_n(EO)_mH$, where D is the starting group which is one of phenolic resin, phenolic amine resin and polyamine, n is 30 to 50, and m is 90 to 120.

Further, the release agent is one or more combinations of nonylphenol phenolic resin polyether, bisphenol A phenolic resin polyether, nonylphenol phenolamine resin polyether, bisphenol A phenolamine resin polyether, tetraethylenepentamine polyether, and polyethylene polyamine polyether.

The invention also provides an application of the method for directly adding a suspension modifier into the fracturing fluid to modify the proppant in real time during fracturing.

The invention has the following beneficial effects.

1. The application of the novel proppant suspension modifier provided by the invention is different from the previous spray modification method, but it is directly added to the fracturing fluid in the form of nanoemulsion, and then released and self-assembled on the surface of the proppant for modification, which is a simple and convenient technology that does not require complicated procedure such as spraying and drying, significantly reducing the modification cost and enhancing the convenience and applicability of the technology.

2. It is simple and rapid to prepare the nanoemulsion suspension modifier involved in the invention. Specifically, mix and stir the raw materials to obtain the stock solution, and then dilute it with water to get the finished product. The proppant obtained can be effectively suspended in water to fill the distal fractures. In addition, the required raw materials are easy to obtain and low in cost, actualizing safe and efficient production on a large scale.

The nanoemulsion suspension modifier prepared by the invention is highly stable and easy to store within the temperature range of −20° C. to 50° C.

BRIEF DESCRIPTION OF DRAWINGS in order to explain the technical solutions in the embodiments of the present invention more clearly, the following will make a brief introduction to the drawings in the embodiments or the present invention. Obviously, the drawings in the following description are merely some embodiments of the present invention and are not intended to limit the present invention.

DETAILED DESCRIPTION OF THE EMBODIMENTS

Figure 1:
FIG. 1 is an effect picture of proppant suspension in the plastic bottle after shaking manually.

The technical solutions of the embodiments of the present invention will be described expressly and integrally in conjunction with the appended figures of the embodiments of the present invention. It is clear that the described embodiments are some but not all of the embodiments of the present invention. According to the embodiments of the present invention, all other embodiments obtained by those of ordinary skill in the art without creative effort fall within the protection scope of the present invention.

The invention discloses a suspension modifier directly added into fracturing fluid for real-time proppant modification during fracturing and the application thereof. The suspension modifier solution is directly added to water while the proppant is added into the water. After stirring, the suspension modifier is capable of self-assembling and being adsorbed on the surface of the proppant, so that the proppant surface becomes hydrophobic and aerophilic. The suspension modifier is added into the fracturing fluid while the proppant is added during fracturing, and the proppant can be modified by the agitation of fluids inside the proppant blender and the effect of turbulent flow in the wellbore.

The suspension modifier of the invention is a controlled release nanoemulsion and comprises surface hydrophobic modifier, surfactant, cosurfactant and water. The suspension modifier is prepared as follows: hydrophobic modifier, surfactant, cosurfactant and water are mixed and emulsified to initially obtain a microemulsion, and then a nanoemulsion suspension modifier is obtained by diluting with water in a specific proportion.

The agent used for hydrophobic modification of the proppant surface is a siloxane compound and its composition, belonging to the oil phase of nanoemulsion; the surface hydrophobic modifier may be of the following structure:

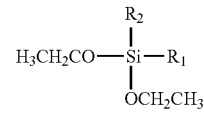

$R_1$ may be of acrylamide or oxyethyl chain containing —$NH_2$ or —$NH_2$ alkane with a unit number of 1 to 10; $R_2$ is linear chain with 8 to 20 carbon atoms, branched alkane, alkylene, or hydrocarbon groups with N, O and S elements. The hydrophobic modified composition is one or more combinations of organosilanes with long hydrophobic chains or active functional groups, which is hydrolyzed with ethoxy group connected with silicon oxygen bond to form hydroxy group the hydroxy group formed by hydrolysis of ethoxy group connected with silicon oxygen bond is condensed with the active group on proppant surface to form a hydrophobic molecular layer through self-assembly.

The purpose of the surfactant used is to disperse and emulsify the oil phase, and the emulsion formed by such surfactant has a response to realize a controlled release effect. The surfactant is one or more combinations of alkyl polyoxyethylene ether sulfate, alkyl amidepropyl betaine, polyoxyethylene sorbitan fatty acid esters, polyethylene glycol, disodium monolauryl sulfosuccinate, sodium lauryl sulfate, potassium didodecyl phosphate, and potassium monoalkyl phosphate.

The cosurfactant used is a monoalcohol or a polyalcohol, which serves to enhance the oil emulsification and improve the stability of the emulsion during stock solution preparation. The cosurfactant is one or more combinations of ethylene glycol, normal propyl alcohol, isopropyl alcohol, propylene glycol, and n-butyl alcohol.

The method for directly adding a suspension modifier into the fracturing fluid to modify the proppant in real time is mainly to directly mix the suspension modifier with the proppant and stir them in clear-water or active-water fracturing fluid to complete the modification. During fracturing, proppant, suspension modifier and release agent are added to the proppant blender at the same time, and then stirred and naturally mixed through the pipeline inside the wellbore to complete the modification, while the modified proppant can adsorb bubbles in the fracturing fluid or gases in the accompanying liquid nitrogen, such as gas bubbles formed by vaporization of the accompanying liquid nitrogen. Subsequently, the modified proppant that adsorbs bubbles floats in the clear-water fracturing fluid and enters the formation fractures under the hydraulic action of the fracturing pump to fill the distal fractures. At the same time, the method for directly adding a suspension modifier into the fracturing fluid is also applicable to the active-water fracturing fluid.

The release agent used is a grafted polyether demulsifier, which can destabilize the nanoemulsion droplets and make them demulsified to release the inner phase. Its structure is $D(PO)_n(EO)_mH$; the release agent should have such structure as multi-branched starting group, polyoxypropylene ether, and polyoxyethylene ether, wherein D is the starting group with multiple active hydrogen atoms, and the structure of grafted polyether chain may be phenolic resin, phenolic amine resin and polyamine. The number (n) of polyoxyethylene PO units is 30 to 50 and the number (m) of polyoxyethylene EO units is 90 to 120. The preferred release agent is one or more combinations of nonylphenol phenolic resin polyether, bisphenol A phenolic resin polyether, nonylphenol phenolamine resin polyether, bisphenol A phenolamine resin polyether, tetraethylenepentamine polyether, and polyethylene polyamine polyether. In practical applications, the release agent should be dissolved at a certain concentration in a dispersion medium which is an organic solvent, selected from one or more of methanol, ethanol, diethylene glycol butyl other, solvent oil, toluene, and xylene.

The basic principle of the invention is to take surface hydrophobic modifier as the internal phase and nanoemulsion suspension modifier as the carrier. The suspension modifier is adsorbed on the surface of the proppant in water and released under control to self-assemble with the proppant surface to form a hydrophobic layer, thereby completing the modification.

Embodiment 1

Preparation Method of Suspension Modifier:
(1) Add 2 pbw of siloxane modifier, 0.8 pbw of dodecyl dimethyl hydroxypropyl sulfobetaine, 0.1 pbw of dicumyl peroxide, 0.5 pbw of normal propyl alcohol and 3 pbw of water into a mixing vessel;
(2) Uniformly stir at 300 r/min for 3 min at room temperature to obtain a stable oil-in-water microemulsion stock solution;
(3) Mix 10 pbw of the stock solution with 25 pbw of water, and then continually stir at 300 r/min for 30 min at room temperature to obtain a transparent water-in-oil nanoemulsion suspension modifier.

Method of Proppant Modification by Suspension:
(1) Add 100 pbw of water and 20 pbw of 40 to 70 meshes quartz sand proppant to the mixing vessel, and then add 0.5 pbw of nanoemulsion suspension modifier and 0.01 pbw of release agent nonylphenol phenolic resin polyether;
(2) Stir at 400 r/min for 1 min to obtain the modified proppant and achieve the final proppant suspension.

Embodiment 2

Preparation Method of Suspension Modifier:
(1) Add 1.5 pbw of siloxane modifier, 0.7 pbw of potassium didodecyl phosphate, 1 pbw of dicumyl peroxide, 0.4 pbw of ethylene glycol and 3 pbw of water into a mixing vessel;
(2) Uniformly stir at 300 r/min for 30 min at room temperature to obtain a stable oil-in-water microemulsion stock solution:
(3) Mix 10 pbw of the stock solution with 30 pbw of water, and then continually stir at 300 r/min for 30 min at room temperature to obtain a water-in-oil nanoemulsion suspension modifier.

Method of Proppant Modification by Suspension:
(1) Add 100 pbw of water and 20 pbw of 40 to 70 meshes quartz sand proppant to the mixing vessel, and then add 0.2 pbw of nanoemulsion suspension modifier and 0.01 pbw of release agent bisphenol A phenolamine resin polyether;
(2) Stir at 400 r/min for 1 min to obtain the modified proppant and achieve the final proppant suspension.

Embodiment 3

Preparation Method of Suspension Modifier:
(1) Add 1 pbw of siloxane modifier, 0.55 pbw of sodium lauryl sulfate, 0.2 pbw of diethylenetriamine, 0.3 pbw of isopropyl alcohol and 3.5 pbw of water into a mixing vessel;
(2) Uniformly stir at 300 r/min for 3 min at room temperature to obtain a stable oil-in-water microemulsion stock solution;
(3) Mix 10 pbw of the stock solution with 40 pbw of water, and then continually stir at 300 r/min for 30 min at room temperature to obtain a water-in-oil nanoemulsion suspension modifier.

Method of Proppant Modification by Suspension:
(1) Add 100 pbw of water and 20 pbw of 30 to 50 ordinary ceramic proppant to the mixing vessel, and then add 0.15 pbw of nanoemulsion suspension modifier and 0.01 pbw of bisphenol A phenolamine resin polyether;
(2) Stir at 400 r/min for 1 min to obtain the modified proppant and achieve the final proppant suspension.

Embodiment 4

Preparation Method of Suspension Modifier:
(1) Add 1.8 pbw of siloxane modifier, 1 pbw of sodium lauryl sulfate, 2 pbw of diethylenetriamine, 0.4 pbw of isopropyl alcohol and 3 pbw of water into a mixing vessel;
(2) Uniformly stir at 300 r/min for 3 min at room temperature to obtain a stable oil-in-water microemulsion stock solution;
(3) Mix 10 pbw of the stock solution with 20 pbw of water, and then continually stir at 300 r/min for 30 min at room temperature to obtain a water-in-oil nanoemulsion suspension modifier.

Method of Proppant Modification by Suspension:
(1) Add 100 pbw of water and 20 pbw of 40 to 70 meshes ordinary quartz sand proppant to the 500 ML plastic bottle, and then add 0.2 pbw of nanoemulsion suspension modifier and 0.01 pbw of release agent bisphenol A phenolic resin polyether;

Cap the plastic bottle, hold and shake it up and down for 30 seconds at a frequency 90 to 120 times per min and a shaking amplitude of 20 to 40 cm, and then let it stand to observe the suspension effect, as shown in FIG. 1. Observe the suspension of proppant in clear water, remove the proppant suspended at the top of clear water, dry and weigh it, and calculate the suspension ratio of self-suspended fracturing proppant in clear water in the embodiment. The results are shown in Table 1.

TABLE 1

Proppant Suspension Ratios in Embodiments 1-4

| Item No. | Weight of suspended | Total weight of proppant | Suspension |
|---|---|---|---|
| Embodiment | 38.06 | 39.86 | 95.50 |
| Embodiment | 37.86 | 40.12 | 94.38 |
| Embodiment | 38.71 | 40.31 | 96.03 |
| Embodiment | 36.99 | 39.94 | 92.63 |

Comparative Embodiment 1

Use 40 to 70 meshes ordinary quartz sand proppant, add 100 pbw of water and 20 pbw of proppant to the mixing vessel, and stir at 400 r/min for 1 min.

Comparative Embodiment 2

Figure 2:
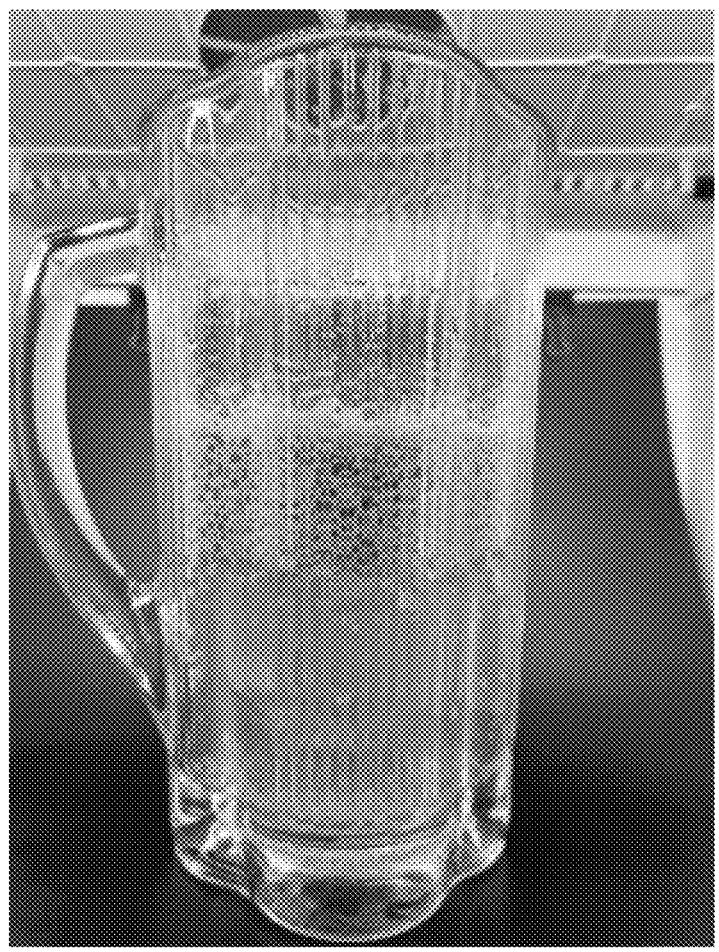
FIG. 2 is an effect picture of proppant suspension in clear water after stirring by Waring Mixer.

Use 40 to 70 meshes ordinary quartz sand proppant, add 100 pbw of water and 20 pbw of proppant to the mixing vessel, followed by 0.5 pbw of suspension modifier in Embodiment 1, stir at 400 r/min for 30 min, and observe the suspension effect; refer to FIG. 2.

Comparative Embodiment 3

Use 40 to 70 meshes ordinary quartz sand proppant, add 100 pbw of water and 20 pbw of proppant to the mixing vessel, followed by 0.5 pbw of suspension modifier in Embodiment 1, and stir at 400 r/min for 1 min.

Comparative Embodiment 4

Use 40 to 70 meshes ordinary quartz sand proppant, add 100 pbw of water and 20 pbw of proppant to the mixing vessel, followed by 0.5 pbw of suspension modifier and 0.01 pbw of release agent in Embodiment 1, and stir at 400 r/min for 1 min.

Comparative Embodiment 5

At the same time, add 0.02 pbw of release agent in Embodiment 1 and stir at 400 r/min for 1 min.

Observe the suspension of proppant in clear water, remove the proppant suspended at the top of clear water, dry and weigh it, and calculate the suspension ratio of self-suspended fracturing proppant in clear water in the embodiment. The results are shown in Table 2.

TABLE 2

Proppant Suspension Ratios in Comparative Embodiments 1 to 5

| Item No. | Modifier Combination | Weight of Suspended Proppant (g) | Total Weight of Proppant Added (g) | Stirring Time (min) | Suspension Ratio (%) |
|---|---|---|---|---|---|
| Comparative Embodiment 1 | None | 0 | 40.2 | 1 | 0 |
| Comparative Embodiment 2 | Suspension modifier | 39.5 | 40.1 | 30 | 98.5 |
| Comparative Embodiment 3 | Suspension modifier | 30.2 | 39.8 | 1 | 75.9 |
| Comparative Embodiment 4 | Suspension modifier + release agent | 39.1 | 39.9 | 1 | 98 |
| Comparative Embodiment 5 | Suspension modifier + excessive release agent | 32.7 | 40.6 | 1 | 80.5 |

According to the suspension results of proppant in Embodiments 1 to 4 above, a nanoemulsion suspension modifier can be prepared and directly added into water to make the proppant become hydrophobic and absorb bubbles so as to achieve stable suspension in the water. The data of Comparative Embodiments 1 to 4 indicates that when no agent is added, the proppant sinks to the bottom in clear water rather than suspending; when only nanoemulsion suspension modifier is added, the proppant can suspend, but the longer the stirring time is, the better the modification effect of the proppant is, because nanoemulsion suspension modifier only releases the modifier inside the inner phase through collision and adsorption; after the release agent is added, the proppant can be modified within 1 min, which indicates that the releasing agent can make the modifier released quickly; according to Comparative Embodiment 5, when excessive release agent is added, the suspension performance is actually reduced, because excessive releasing agent can destroy the combination of nanoemulsion suspension modifier and proppant, resulting in a decrease in suspension effect. It follows that the combination of nanoemulsion suspension modifier and release agent can achieve better effect, realize simple and rapid modification of the proppant, and make the proppant suspend efficiently in clear water.

Although the embodiments of the present invention have been shown and described, it will be understood to those of ordinary skill in the art that a wide variety of changes, modifications, substitutions, and variations may be made to these embodiments without departing from the principle and spirit of the present invention, and the scope of present invention is limited by the appended claims and their equivalents.

What is claimed is:

1. A method for directly adding a suspension modifier into the fracturing fluid to modify the proppant in real time, comprising:
    mixing the following raw materials in a proppant blender during fracturing:
        0.15 to 0.5 parts by weight (pbw) of suspension modifier, 20 pbw of proppant, 0.01 pbw of release agent and 100 pbw of water; and
    completing the real-time modification of the proppant with the suspension modifier;
    wherein the suspension modifier comprises 1 to 2 pbw of surface hydrophobic modifier, 0.5 to 1 pbw of surfactant, 0.5 to 2.4 pbw of cosurfactant, and 3 to 3.5 pbw of water;
    wherein the surface hydrophobic modifier is a siloxane compound and its composition;
    wherein the surfactant is one or more combinations of alkyl polyoxyethylene ether sulfate, alkyl amidepropyl betaine, polyoxyethylene sorbitan fatty acid esters, polyethylene glycol, disodium monolauryl sulfosuccinate, sodium lauryl sulfate, potassium didodecyl phosphate, and potassium monoalkyl phosphate;
    wherein the cosurfactant is one or more combinations of diisopropyl benzene peroxide, diethylenetriamine, ethylene glycol, normal propyl alcohol, isopropyl alcohol, propylene glycol, and n-butyl alcohol; and
    wherein the release agent used is a grafted polyether demulsifier and the structure of the release agent is: $D(PO)_n(EO)_mH$,
        wherein D is the starting group, and is one of phenolic resin, phenolic amine resin and polyamine, n is 30 to 50, and m is 90 to 120.

2. The method for directly adding a suspension modifier into the fracturing fluid to modify the proppant in realtime according to claim 1, wherein the surface hydrophobic modifier is of the following structure:

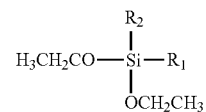

wherein $R_1$ is one of an acrylamide or oxyethyl chain containing —$NH_2$ or —$NH_2$ alkane with a unit number of 1 to 10, and $R_2$ is a linear chain with 8 to 20 carbon atoms, branched alkane, alkylene, or hydrocarbon groups with N, O, and S elements.

3. The method for directly adding a suspension modifier into the fracturing fluid to modify the proppant in realtime according to claim 1, wherein the method of preparing the suspension modifier comprises:
    mixing surface hydrophobic modifier, surfactant, cosurfactant, and water obtain microemulsion stock solution; and
    mixing 10 pbw of the microemulsion stock solution and 50 to 100 pbw of water and stir them for 30 minutes to obtain the suspension modifier.

4. The method for directly adding a suspension modifier into the fracturing fluid to modify the proppant in real time according to claim 1, wherein the proppant is one or more combinations of 40 to 70 mesh quartz sand and ceramic particles, the stirring speed is 400 r/min, and the stirring time is 1 minute.

5. The method for directly adding a suspension modifier into the fracturing fluid to modify the proppant in real time according to claim 1, wherein the release agent is one or more combinations of nonylphenol phenolic resin polyether, bisphenol A phenolic resin polyether, nonylphenol phenolamine resin polyether, bisphenol A phenolamine resin polyether, tetraethylenepentamine polyether, and polyethylene polyamine polyether.

* * * * *